Figure 1:
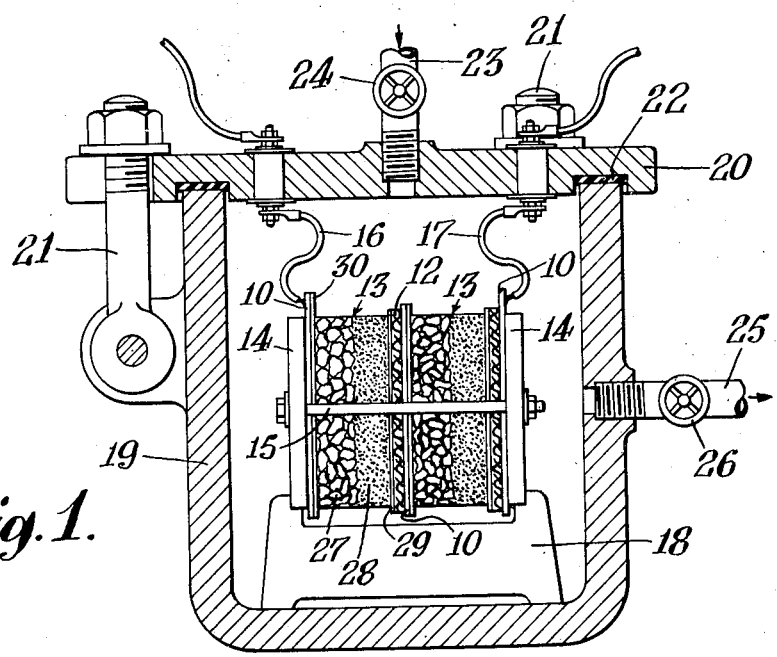

Sept. 30, 1952    N. C. CAHOON ET AL    2,612,538
PRIMARY GALVANIC CELL AND BATTERY AND METHOD OF MAKING SAME
Filed Oct. 6, 1948

INVENTORS
NELSON C. CAHOON
GEORGE W. HEISE
BY D. C. Harrison
ATTORNEY

Patented Sept. 30, 1952

2,612,538

UNITED STATES PATENT OFFICE 2,612,538

PRIMARY GALVANIC CELL AND BATTERY AND METHOD OF MAKING SAME

Nelson C. Cahoon, Lakewood, and George W. Heise, Fairview, Ohio, assignors, by mesne assignments, to Union Carbide and Carbon Corporation, a corporation of New York Application October 6, 1948, Serial No. 52,988

14 Claims. (Cl. 136—136)

This invention relates to a cell of the so-called "dry" type, wherein the elements are adapted to be clamped together under pressure, and more specifically to a thin, flat, deferred-action type dry cell activated by a depolarizing gas, and is an improvement upon the prior invention described and claimed in the application of George W. Heise and Erwin A. Schumacher, Serial No. 52,472, filed October 2, 1948, for Primary Cell and Battery and Method of Making Same.

In general, the cell disclosed in the Heise and Schumacher application as well as in the present application comprises an anode of zinc or other suitable metal and a carbon cathode between which are an electrolyte paste and a bibulous separator.

The improvement of the present invention is in the means for and the manner of distributing the depolarizing gas quickly and thoroughly throughout the cathode and of activating the cell, a film type of bibulous separator of low moisture transmission and a reticulated electrode separator and paste retainer, the objects being to increase the rate at which current may be withdrawn from the cell while maintaining the voltage, to increase the accessibility of the depolarizing gas to a large area of the wet cathode, to accelerate the permeation of the wet cathode by the activating and depolarizing gas, to more evenly support the bibulous separator, to decrease the transfer of water between the electrolyte paste and the cathode, to improve the keeping qualities of the cell, and to facilitate cell manufacture.

Figure 2:
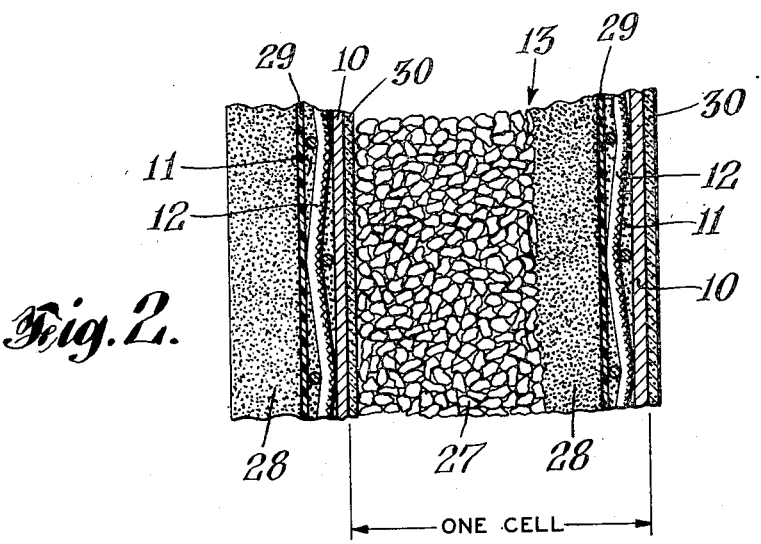

Referring to the drawing:

Fig. 1 is a longitudinal elevation partly in section showing a battery of only two cells; and Fig. 2 is an enlarged detail showing the wet and dry cathodes hereinafter referred to, as well as other elements of the cell.

The battery in the drawing comprises only two cells but it will be understood that any number of such cells may be used. Each cell includes an anode 10 preferably of zinc but of any other metal such as those mentioned in the Heise and Schumacher application. Contiguous to the anode 10 is an immobilized layer of electrolyte paste material 11 surrounded by a netting material 12. The cathode material 13 is in two parts, as will later be described, and end plates 14, preferably of stiff insulating material, have bolts 15 which clamp the cells between these end plates. Terminal leads 16 and 17 lead off from the battery. A pedestal support 18 maintains the battery elements out of contact with the housing 19. A cover 20 for the housing 19 is held in place by bolts 21. A gasket 22 forms a hermetically-tight interior for the housing. A pipe 23 controlled by a valve 24 supplies the chlorine gas to the cell for activation thereof. Prior to activation of the cell, the interior of the housing and the cell may be exhausted of gas by means of a pipe 25 having a control valve 26, this pipe leading to a vacuum pump.

Where the cathode in the aforementioned Heise and Schumacher application is porous enough to absorb the depolarizing gas and also moist enough to allow the gas to enter into aqueous solution, the cathode 13 in the present invention is composite, comprising a dry diffuser cathode 27 each portion of which is substantially as porous and permeable as each other portion and a wet cathode 28 of carbon black. Both the cathodes 27 and 28 are shown in the drawing as being fairly thick; in practice they may be made so thin that the entire cell is no more than ¼ inch thick, the cathode 27 being as thin as 0.1 inch and the cathode 28 as thin as 0.08 inch. However, cathodes 27 and 28 may be as thick as 1 inch or more and ½ inch or more, respectively, if desired. The carbon black or wet cathode mix is porous enough to contain the necessary moisture. This portion 28 of the composite cathode contains, typically, 200 parts by weight of acetylene black, 519 parts by weight of aqueous 10% zinc-chloride solution and has 15–20% of its volume (wet) of open pores. Variations in the materials, amounts thereof and porosity or per cent pores, are in accordance with the description in said Heise and Schumacher application. The dry diffuser cathode 27 is preferably a No. 30 porous carbon, preferably graphite, of the type described in Broadwell and Werking Patent No. 1,988,478 and also in the article entitled "Fabricated porous carbon" by L. C. Werking, appearing at vol. 74, page 365 (1938) in The Transactions of the Electrochemical Society, being preferably between 30 and 70% porous as well as electrically conductive. The dry cathode has a gas permeability between 1.5 and 45 cubic feet per square foot per minute at 2 inches of water pressure, as more fully stated in the article.

Between the immobilized electrolyte 11 and the wet cathode 28 is a bibulous separator of the continuous, amorphous (non-fibrous) type, typically, a layer of cellulose film 29 only about 0.001 inch thick which is non-waterproofed, transparent and previously saturated by immersion in an aqueous 10% zinc-chloride solution, the film having been applied and rolled smooth over the paste surface. Specifically this film is known as Du Pont "Cellophane" No. 450-PT plain. It was found that, particularly in cells wherein the wet cathode contained a small amount of water, the carbon black tended to abstract water from the electrolyte paste. This thickened the paste during prolonged storage and resulted in a shrinkage of this portion of the cell. In accordance with the present invention, the separator sheet is bibulous but tenaciously retains its sorbed water and substantially reduces the extent of water transfer, giving a system which is more stable over longer periods of time.

The immobilized electrolyte paste contains, typically, about 104 parts by weight of water, 26 parts by weight of zinc chloride, 14 parts by weight of 100 viscosity methyl cellulose, and 1.8 parts by weight of mercuric chloride.

An important feature of the cell is the reticulated electrode spacer and paste retainer, the paste and retainer being mutually embedded. The pastes may be those disclosed in the Heise and Schumacher application. The netting is preferably the usual cotton mosquito netting which is trimmed from the edges of the anode leaving a margin about 1/8 inch wide.

The netting keeps the paste from spreading and maintains it in a layer of uniform thickness over the anode surface when the parts of the cell are clamped together. This is particularly important in a flat type cell. The paste should have such a consistency that it does not ooze or run out of the space between the electrodes on account of its own mobility but otherwise it should be as fluid as possible in order to afford the best electrical contact between the elements of the cell with which it contacts. The netting serves the dual purposes of separating the electrode elements and of supporting and immobilizing the paste, yet netting differs from paper or other porous separator in that the netting is reticulated and thus provides extensive current paths directly between the elements of the cell which contact the paste and it differs from paste-retaining separators located at the periphery of the paste layer and adjacent parts in that it provides numerous chambers for the paste and numerous points of support for the adjacent cell elements. The netting is somewhat yieldable under compression so that as the electrode elements are forced together, the warp and weft threads flatten and form small closed compartments containing paste under compression, the threads forming the side walls of the compartments and also supporting and spacing the electrode elements at numerous places. With the small electrolyte compartments afforded by netting, the electrolyte may have a consistency as low as about 5,000 centipoises corresponding to approximately 5 grams of 100 viscosity methyl cellulose to 100 parts of electrolyte water or a consistency as high as that of library paste or a consistency within this range.

The netting may be of any material which does not disintegrate under the influence of the aqueous electrolyte, or nitrogen or such halogen as is used for depolarization, for instance synthetic fibres of resin, rubber and the like which are resistant to these influences, for instance those sold under the brand names of "nylon," "Vinyon," "neoprene" and the like, or glass. The preferred netting, however, is cotton because of low cost and availability and absorbent characteristics. The mesh of the netting may conveniently be from 6 to 30 openings per linear inch and the threads may conveniently be about 0.006 inch in diameter or about 1/2 the desired thickness of the paste layer, with moderate variations, for instance ±25%, on either side of these figures. Too large a mesh in a cell of the type contemplated herein results in the edges of some of the openings extending so far beyond the edge of the electrode area that the paste cannot be confined as close to the edges of the cell as is desired. Also, too large an opening does not give the cathode mix and separator 29 the desired support and allows the cathode to press too closely to the anode or even press entirely through the anode paste. Too small a mesh requires so many netting threads that too much of the anode area contacts the threads and not enough of the anode area contacts the anode paste. Netting threads which are too thick require a thick layer of anode paste and give a cell which is thicker than necessary and of higher internal resistance, they do not form as tight a seal against movement of the anode paste at the corners of the meshes where the warp and weft threads cross and they contact too high a portion of the anode leaving active too little of the anode.

Sufficient anode paste should be used to fill the openings in the netting and have the paste pack tightly against the adjacent elements of the cell when the cell is compressed. Too little paste in the meshes of the netting does not sufficiently force the paste against the adjacent elements of the cell for the best contact; and too much paste causes the excess paste to ooze from the periphery when the cell elements are pressed together, with the possibility of establishing electrolytic contact with the adjacent cell. In preparing the cell, the meshes of the netting are filled with the anode paste and the excess paste removed by a straight edge passed over the surface of the netting. The layer of immobilized anodic electrolyte thus formed is coextensive with the netting, about 0.02 inch thick and weighs about 0.015 ounce per square inch of active anode surface.

An electrically conductive moisture-impervious coating 30 lies between the dry cathode and the anode of the next cell.

A feature of the present invention is the composite cathode in two parallel parts of different characteristics and positions, one part 28 being wet and situated nearer the anode and the other part 27 being dry and lying on the side of the wet cathode away from the anode. In effect there are a wet cathode and a dry cathode in series.

This arrangement of cathodes has numerous advantages peculiar to this type of cell, relating not only to the activation of the cell but to its mechanical construction and the mechanics of its use. The wet cathode contains carbon black particles and aqueous electrolyte and is rather soft; and when one or more of the cells is clamped under pressure, there is a tendency for the wet cathode material to extrude to the open side of the cell where it may contact the anode of the next cell. Chlorine gas permeates this wet cathode very well but improvement was sought in enlarging the area through which chlorine gas could pass rapidly from the outside of the cell into the wet cathode and yet obtain this result without loss of valuable space or use of electrochemically inert materials, while strengthening the cells.

The dry cathode is useful in these respects. It is of such a nature that it does not deform under the clamping pressure and thus, so far as it is concerned, will not move sidewise and contact either anode. The dry cathode also distributes the clamping pressure quite uniformly over the wet cathode. It is of quite large and hard particles relative to the particles of the wet cathode; the particles of the dry cathode are preferably rounded and carefully sized so that substantially no dust fills the spaces between the particles and they are bonded prior to use in the cell by other carbon. The dry cathode may conveniently be prepared according to the method disclosed in Broadwell and Werking Patent No. 1,988,478, preferably being between 30 and 70% porous although it may have a minimum porosity of 10%.

The dry cathode is not "bone dry" when the cell is in the housing, as the wet electrode elements give off moisture and the dry cathode will absorb moisture from the atmosphere surrounding the cell, in fact, there is a slight creepage of aqueous electrolyte from the wet cathode into that portion of the dry cathode which contacts the wet cathode but it is not material. Thus the dry cathode may be very slightly moist but there is no collection of water in the pores of or filling the spaces between the particles of the dry cathode which is substantially as porous and permeable to gas as if it were bone dry. Thus when the housing and cell are evacuated prior to the activation of the cell and the cell is then surrounded with gaseous chlorine, the chlorine readily and quickly passes through and permeates the dry cathode. The chlorine and dry cathode appear to cooperate in the activation of the cell from two different points of view; the chlorine immediately saturates the small amount of moisture in the dry cathode and affords an immediate depolarization action, and the products formed by the solution of the chlorine and the depolarization action immediately make the moisture on the dry cathode more conductive. The highly porous dry cathode also allows the chlorine readily to distribute over and to contact substantially the entire flat face of the wet cathode so that the wet cathode readily and quickly absorbs chlorine, more so than if the wet cathode could absorb chlorine only from the sides inwardly, and thus the wet cathode comes into a depolarized condition more quickly than it otherwise would and the entire flat face of the wet cathode nearest the anode can be operable as there are no channels cut in the wet cathode. Thus the dry cathode acts as a diffuser for the chlorine, facilitating the depolarization of the wet cathode, and gives an immediate depolarization of the cell, tiding the cell over from the time when the depolarizing gas is admitted to the cell until the time when the wet cathode can absorb sufficient chlorine to depolarize the cell by itself. As the depolarizing action of the dry cathode is decreasing, the depolarizing ability of the wet cathode is increasing.

Conveniently the dry cathode may be a layer of porous carbon sawn from a larger piece prepared according to the Broadwell et al. patent previously mentioned. The dry cathode should be of such a size that it will not touch the anode of the next cell, the conducting coating 30 permitting current to pass between the dry cathode of one cell and the anode of the next cell in series but preventing electrolyte from contacting the electrodes of adjoining cells to set up an intermediate cell. The dry cathode as well as the wet cathode preferably stop about ¼ inch short of the edge of the conducing coating, which is contiguous to the zinc sheet.

In producing the cell, a flat sheet of anode metal of the size desired is coated on one side with conducting paint or resin or any conducting composition which yields an adherent imporous, non-water absorptive coating in conductive contact with the metal. The coating may be of the composition disclosed in Patent No. 2,379,976. When the coating is dry or hard, a layer of netting is applied to the non-coated side of the metal and while the netting is held smooth in any manner, the meshes are completely filled with the electrolyte paste and the excess, if any, scraped off with a straight edge. Care is taken in spreading the paste to insure good contact between the paste and the metal and to eliminate any air bubbles. The bibulous separator film, wet with electrolyte, is then laid over the pasted cloth and rolled to smooth it and to eliminate any air bubbles. This provides an anode assembly. The netting, paste and bibulous separator film preferably cover such an area that a margin of anode, uncovered by either netting, paste or separator and about ⅛ inch wide, remains around the edge of the anode.

In making the cathode assembly, the wet cathode is either molded separately or molded directly on the dry cathode. The direct molding may conveniently be done by making the dry cathode the bottom of a mold with removable sides of the proper height and spacing, and then filling the mold with loose wet cathode mix and compressing or tamping to give the wet cathode the desired rigidity, thickness and porosity and to bind it to the dry cathode by reason of the roughness of the surface of the dry cathode and the mutual embedment of the surface particles of the two cathodes. The sides of the mold are then removed. The sides of the mold may be spaced so that the composite cathode is of the exact size desired when the mold is removed or the spacing may be such that the composite cathode is oversize as molded, the edges of the composite cathode then being cleanly trimmed to give a composite cathode of the desired size. In subsequent manipulations the hard dry cathode supports the weaker wet cathode.

To assemble a battery of cells in series, the anode assembly and the cathode assembly are brought together with the bibulous separator film of the anode assembly contacting the wet cathode of the cathode assembly, the anode assembly of the second cell is then placed in position with the conducting coating contacting the dry cathode of the first cell, the cathode assembly of the second cell is then positioned with the wet cathode contacting the bibulous separator of the anode assembly last applied and so on for as many cells as desired until the last cell of the series is reached when the dry cathode has applied to it a sheet of metal, carbon or other conducting material forming a terminal. If the terminal is metal, it preferably has a layer of the conducting coating for contact with the dry cathode of the last cell, as shown in Fig. 1 for the left hand cell. Conveniently, the terminal may be a sheet of anode metal carrying the conducting coating, that is an anode assembly without the netting, paste or bibulous separator. Also, the anode of the first cell, the right hand cell of Fig.1, need not have the conducting coating.

It will be understood that while the preferred cell has the composite cathode, the amorphous, non-fibrous separator, and the netting spacing and electrolyte-retaining element used together, any of these may be used separately in the cell disclosed in the Heise and Schumacher application; for instance, the composite cathode may be used with the fibrous separator sheet and the peripheral spacer disclosed in said application; or the amorphous separator may be used with the unitary cathode and peripheral spacer of the prior cell; or the netting spacer may be used with the unitary cathode or fibrous separator of the prior application; or two of the features disclosed herein may be used in the prior cell with advantages peculiar to this type of cell.

What is claimed is:

1. A substantially flat primary galvanic cell comprising: a substantially flat anode and a substantially flat cathode, means for holding the electrodes pressed together; a non-metallic reticulated spacing element between the electrodes resisting the pressure forcing the electrodes together; within the reticulations, electrolyte material having a consistency within the range from a viscosity of 5,000 centipoises to a paste; and an electrically conductive barrier sheet between the cathode and the electrolyte material acting as a physical barrier preventing mingling of the viscous electrolyte material with the material of the cathode.

2. A primary galvanic cell comprising: an anode and a cathode exposed to a gaseous atmosphere, means for holding the electrodes pressed together; non-metallic netting and electrolyte material, mutually embedded, between the electrodes, the netting resisting the pressure forcing the electrodes together and spacing the electrodes, the electrolyte material having a consistency within the range from a viscosity of 5,000 centipoises to a paste; and an electrically conductive barrier sheet between the cathode and the electrolyte material acting as a physical barrier preventing mingling of the viscous electrolyte material with the material of the cathode.

3. A primary galvanic cell comprising: an anode and a cathode exposed to a gaseous atmosphere, means for holding the electrodes pressed together; a reticulated cellulosic spacing element and electrolyte material, mutually embedded, between the electrodes, the spacing element resisting the pressure forcing the electrodes together and spacing the electrodes; the electrolyte material having a consistency within the range from a viscosity of 5,000 centipoises to a paste; and an electrically conductive barrier sheet between the cathode and the electrolyte material acting as a physical barrier preventing mingling of the viscous electrolyte material with the material of the cathode.

4. A substantially flat primary galvanic cell comprising a substantially flat anode and a substantially flat cathode, means for holding the electrodes pressed together; electrolyte material and cotton netting having between 6 and 30 meshes per linear inch, mutually embedded between the electrodes, the netting providing numerous supports within the peripheries of the electrodes spacing the electrodes and providing numerous small closed chambers of electrolyte material between the electrodes; the electrolyte material having a consistency within the range from a viscosity of 5,000 centipoises to a paste; and an electrically conductive barrier sheet between the cathode and the electrolyte material acting as a physical barrier preventing mingling of the viscous electrolyte material with the material of the cathode.

5. A primary galvanic cell comprising: an anode and a porous cathode exposed to a gaseous atmosphere, means for holding the electrodes pressed together; a spacing element between the electrodes resisting the pressure forcing the electrodes together; electrolyte material within the space between the electrodes, said material containing water; and an amorphous bibulous membrane between the electrolyte material and the cathode resisting the transfer of water between the electrolyte material and the cathode.

6. A primary galvanic cell comprising: an anode and a porous cathode, means for holding the electrodes pressed together; a spacing element between the electrodes resisting the pressure forcing the electrodes together; electrolyte material within the space between the electrodes, said material containing water; and an amorphous bibulous cellulosic membrane between the electrolyte material and the cathode resisting the transfer of water between the electrolyte material and the cathode.

7. A primary galvanic cell comprising: an anode and a cathode, means for holding the electrodes pressed together; the cathode being porous and containing water; a spacing element between the electrodes resisting the pressure forcing the electrodes together; electrolyte material within the space between the electrodes, said material containing water; and an amorphous bibulous membrane between the electrolyte material and the cathode resisting the transfer of water between the electrolyte material and the cathode.

8. A primary galvanic cell comprising: an anode; and a composite cathode presenting two porous cathode portions of different porosity, the portion of lesser porosity situated nearer the anode and being softer than the portion of greater porosity, the portion of greater porosity comprising carbon particles bonded to one another by an electrically conductive bonding agent and having a rough surface for contact with the softer portion of the cathode, the contacting surfaces of the cathode portions being mutually embedded, the rough surface of the bonded portion supporting the other portion of the cathode.

9. A primary galvanic cell comprising: an anode; and a composite cathode presenting two substantially parallel cathode portions of different permeability to gas, the portion of lesser permeability situated nearer the anode, the portion of greater permeability comprising carbon particles bonded to one another by an electrically conductive bond and having a rough surface for contact with the portion of lesser permeability, the contacting surfaces of the cathode portions being mutually embedded, the rough surface of the bonded portion supporting the other portion of the cathode.

10. A primary galvanic cell comprising: an anode; and a composite cathode presenting two porous cathode portions of different depolarizing action, the portion of greater depolarizing action situated nearer the anode, the portion of lesser depolarizing action comprising carbon particles bonded to one another by an electrically conductive bonding agent having a rough surface for contact with the other portion of the cathode, the contacting surfaces of the cathode portions being mutually embedded, the rough surface of the bonded portion supporting the other portion of the cathode.

11. A primary galvanic cell comprising: a sheet zinc anode; a composite cathode presenting two porous carbon portions of different characteristics situated at different distances from the anode; the portion nearer the anode being softer, less porous, less permeable to gas, containing more water, and having a greater depolarizing action and smaller sized, more sorptive average particles than the other portion, the average particle having a chain type structure; the average particle of said other portion having a discontinuous structure; an amorphous, bibulous membrane contiguous with the face of the cathode nearest the anode; aqueous electrolyte material and cotton netting having between 6 and 30 meshes per linear inch, mutually embedded, between the anode and the membrane, the netting providing numerous supports within the peripheries of the electrodes spacing the membrane from the anode and providing numerous small closed chambers of electrolyte material between the anode and the membrane, and the membrane preventing contact between the anode and the cathode and resisting the transmission of water between the electrolyte material and the cathode; the electrolyte material having a consistency within the range from a viscosity of 5,000 centipoises to a paste.

12. Method of making a primary galvanic cell which comprises: providing an anode and a porous cathode; providing a reticulated yieldable spacing element adapted to space the electrodes when they are pressed together and to provide an electrolyte chamber; providing an electrolyte containing water; providing a bibulous amorphous membrane of a size to be supported on the separator to cover the electrolyte chamber; assembling the cell with the spacing element contiguous with the anode and the amorphous membrane, the cathode contiguous with the membrane and the chamber filled with electrolyte; and pressing the anode and the membrane toward each other until the electrolyte will not run out of the chamber.

13. Method of making a primary galvanic cell which comprises: providing an anode and a cathode; providing a cotton netting of a size to cover the anode and having meshes smaller than the surface of the anode; providing an electrolyte having a viscosity greater than that of water; providing an amorphous bibulous separator sheet of a size to cover the face of the cathode adjacent the electrolyte; assembling the cell with the netting and electrolyte, mutually embedded, contiguous with the anode and with the separator sheet, and the cathode contiguous with the separator sheet; and pressing the anode and separator sheet toward each other until the electrolyte will not run out of the meshes of the netting.

14. Method of making a primary galvanic cell which comprises: providing an anode; providing a composite cathode with one portion wetter and less porous than another portion; providing a reticulated yieldable spacing element adapted to space the electrodes when they are pressed together and to provide an electrolyte chamber; providing an electrolyte; providing an amorphous bibulous separator sheet of a size to cover the face of the cathode adjacent the electrolyte; assembling the cell with the spacing element contiguous with the anode and the separator sheet, the less porous portion of the cathode contiguous with the separator sheet and the chamber filled with electrolyte; and pressing the anode and the separator sheet toward each other until the electrolyte will not run out of the chamber.

NELSON C. CAHOON.
GEORGE W. HEISE.

REFERENCES CITED

The following references are of record in the file of this patent:

UNITED STATES PATENTS

| Number | Name | Date |
| --- | --- | --- |
| 356,261 | Pearce | Jan. 18, 1887 |
| 375,034 | Wilder | Dec. 20, 1887 |
| 480,384 | Dow | Aug. 9, 1892 |
| 1,080,234 | Rordame | Dec. 2, 1913 |
| 1,766,418 | Weissmann | June 24, 1930 |
| 1,988,478 | Broadwell et al. | Jan. 22, 1935 |
| 2,422,045 | Ruben | June 10, 1947 |

FOREIGN PATENTS

| Number | Country | Date |
| --- | --- | --- |
| 7,189 | Great Britain | of 1886 |
| 14,615 | Great Britain | of 1908 |
| 540,984 | Great Britain | Nov. 7, 1941 |

OTHER REFERENCES

Ser. No. 394,417, Marhenkel (A. P. C.) published May 11, 1943.